United States Patent [19]
Cresse et al.

[11] Patent Number: 5,429,706
[45] Date of Patent: Jul. 4, 1995

[54] SYSTEM AND METHOD FOR INSTALLING A HOLLOW HANDGRIP OVER AN ELONGATED SHAFT END

[76] Inventors: Larry R. Cresse, 10953 Tuxford, No. 13, Sun Valley, Calif. 91352; Richard J. Cresse, 2647 Bent Spur, Acton, Calif. 93510; Donald L. Davidson, 286 S. Marengo Ave., Pasadena, Calif. 91101

[21] Appl. No.: 219,749

[22] Filed: Mar. 29, 1994

Related U.S. Application Data

[63] Continuation of Ser. No. 901,423, Jun. 19, 1992, abandoned.

[51] Int. Cl.6 .................... B05C 7/00; B29C 63/20; B29C 65/52
[52] U.S. Cl. .................... 156/356; 118/408; 118/705; 118/DIG. 10; 156/423; 156/578; 222/334
[58] Field of Search ........... 156/285, 287, 294, 423, 156/578, 356; 29/235, 280, 282; 118/214, 215, 254, 408, DIG. 10, 705; 222/334, 336, 340, 380

[56] References Cited

U.S. PATENT DOCUMENTS

| | | |
|---|---|---|
| 1,122,616 | 12/1914 | Kuebler et al. |
| 2,264,632 | 12/1941 | Gerlitzki . |
| 2,268,876 | 1/1942 | Kagley . |
| 2,302,306 | 11/1942 | Faast .................... 118/408 |
| 2,426,969 | 9/1947 | Hallowell, Jr. . |
| 2,432,401 | 12/1947 | Etem .................... 118/215 |
| 2,491,185 | 12/1949 | Kamborian . |
| 2,760,585 | 8/1956 | Bergeron . |
| 2,877,480 | 3/1959 | Warren . |
| 2,954,146 | 9/1960 | Hullman .................... 222/334 |
| 3,121,020 | 2/1964 | Low .................... 118/215 |
| 3,601,291 | 8/1971 | Tessmer . |
| 3,748,049 | 7/1973 | Kaupfer et al. .................... 118/215 |
| 3,846,901 | 11/1974 | Lovett .................... 29/235 |
| 3,889,628 | 6/1975 | Usab . |
| 4,280,864 | 7/1981 | Bromberg .................... 118/254 |
| 4,291,641 | 9/1981 | Nowak . |
| 4,391,661 | 7/1983 | Izraeli .................... 156/287 |
| 4,677,872 | 7/1987 | Nishida et al. .................... 29/235 |
| 4,885,049 | 12/1989 | Johannesson .................... 156/423 |
| 4,899,428 | 2/1990 | Hsu .................... 29/235 |
| 5,256,203 | 10/1993 | Moore et al. .................... 118/408 |

*Primary Examiner*—Steven D. Maki
*Attorney, Agent, or Firm*—John R. Flanagan

[57] ABSTRACT

A system for installing an elongated hollow handgrip over an elongated end portion of a golf club shaft is operable to apply a liquid adhesive to an interior surface portion of the hollow handgrip so as to produce a coating of adhesive thereon and then to apply the hollow handgrip with the adhesive coating applied on the interior surface portion thereof over the end portion of the golf club shaft. The liquid adhesive is applied by use of a probe capable of receiving the hollow handgrip over the probe. The probe has an elongated central passageway with an inlet for receiving a flow of liquid adhesive and an outlet for dispensing the liquid adhesive from the probe. Also, the probe has an annular groove in an exterior surface portion communicating with the passageway outlet for receiving liquid adhesive from the outlet and wiping the liquid adhesive onto the interior surface portion of the handgrip as it is being moved past the annular groove to removed from the handgrip from the probe. The handgrip is applied to the shaft end portion by use of a tool to slightly inflate or swell the hollow handgrip and then floatably slide the inflated handgrip onto the end portion of the golf club shaft.

7 Claims, 2 Drawing Sheets

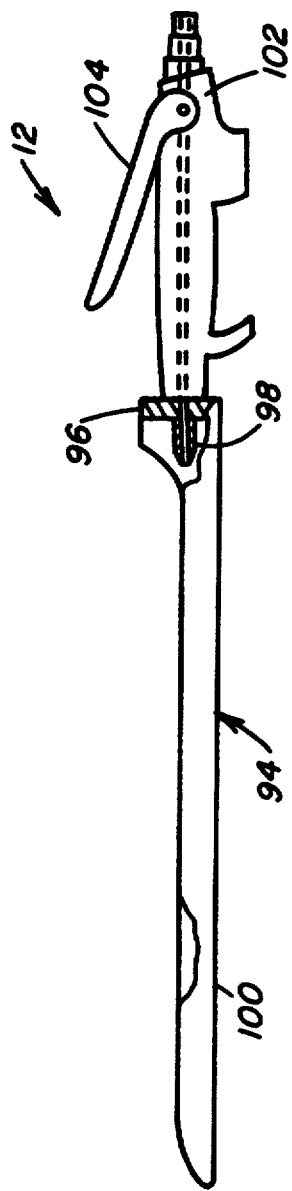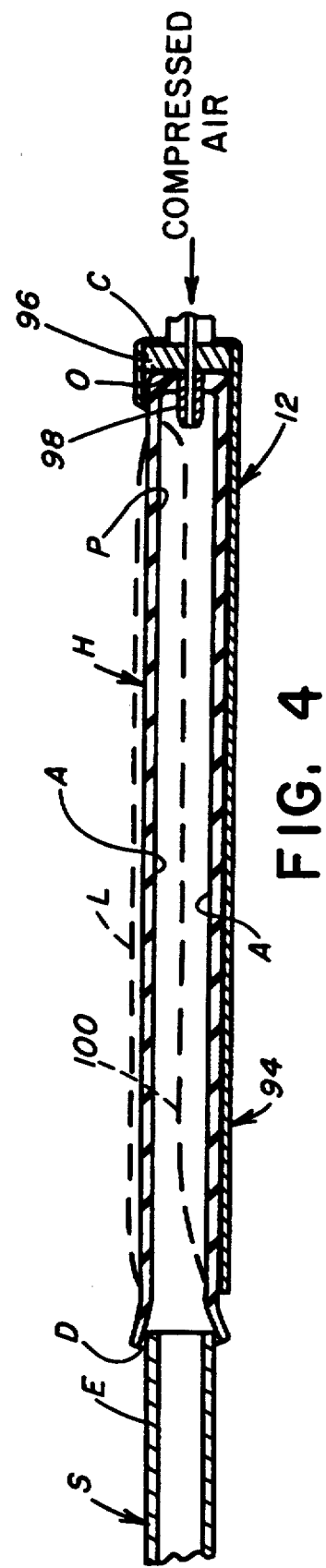

SYSTEM AND METHOD FOR INSTALLING A HOLLOW HANDGRIP OVER AN ELONGATED SHAFT END

This application is a continuation of application Ser. No. 07/901,423, filed Jun. 19, 1992, now abandoned.

BACKGROUND OF THE INVENTION

1. Field of the Invention

The present invention generally relates to golf club assembly and, more particularly, is concerned with a system and method for applying a coating of a liquid adhesive to an interior surface portion of a hollow handgrip for a golf club and then applying the adhesively-coated handgrip over an end portion of an elongated shaft of the golf club.

2. Description of the Prior Art

A golf club has an elongated shaft with a handgrip on one end portion and a playing head on the other end. The shaft is an elongated rod or tube fabricated from any suitable metal, such as aluminum or a composite material. The club head is made from a suitable material fabricated or cast in the desired shape. The handgrip is a hollow tube open at one end and closed at the other end and made from any suitable resiliently flexible material, such as rubber or some other elastomeric material.

Due to several factors, the handgrip applied over the end portion of the club shaft is held substantially immovable relative to the shaft during use of the golf club. One factor is the establishment of a frictional fitted relationship between the handgrip and shaft end portion by providing a handgrip with an inside diameter being slightly smaller than the outside diameter of the shaft end portion. Another factor is the establishment of a bonded relationship between the handgrip and shaft end portion by providing an adhesive material between the handgrip interior and the shaft end portion exterior surface. However, from normal use of the golf club the handgrip tends to deteriorate and wear out and so the handgrip must be replaced, usually several times, during the life of the golf club.

The procedure used heretofore to install the hollow handgrip over the shaft end portion has been a source of problems. First, the shaft end portion is wrapped with a masking tape having double-sided layers or coatings of an adhesive. Then, the handgrip is forced over the wrapped shaft end portion. One problem is that due to the smaller diameter size of the handgrip compared to the shaft end portion, the friction of the handgrip against the wrapped masking tape may disturb the desired wrapped relationship of the masking tape about the shaft end portion. The wrapped tape may be pulled apart slightly at some regions and bunched up at others, producing a non-uniform bond between the shaft end portion and handgrip and an uneven feel along the length of the handle grip. Another problem is that the procedure itself for first wrapping the masking tape and then inserting the handgrip over the wrapped shaft end portion requires a certain degree of skill on the part of an operator and is also time-consuming and expensive.

Consequently, a need still exists for an improved procedure for installing a hollow handgrip over an end portion of the golf club shaft which will avoid these problems without introducing new ones in their place.

SUMMARY OF THE INVENTION

The present invention provides a handgrip installing system and method designed to satisfy the aforementioned need. The installing system and method of the present invention eliminates the use of masking tape to apply an adhesive between the handgrip and the end portion of the golf club shaft. Instead, the system and method of the present invention introduces an automated means for applying an adhesive coating to an interior surface portion of the hollow handgrip. Also, the system and method of the present invention employs a tool for swelling and floatably inserting the adhesively coated handgrip over the end portion of the golf club shaft. Using the system and method of the present invention, about six handgrips per minute can be installed, whereas using the prior technique it took about one and a half minutes per handgrip.

Accordingly, the present invention is directed to system and method for installing an elongated hollow handgrip over an elongated end portion of a shaft, such as a golf club shaft. The handgrip installing system and method comprise the operative steps of: (a) applying a liquid adhesive to an interior surface portion of an elongated hollow handgrip so as to produce a coating of the adhesive on the interior surface portion of the hollow handgrip; and (b) applying the hollow handgrip with the coating of liquid adhesive applied on the interior surface portion thereof over an elongated end portion of a shaft.

The liquid adhesive is applied from a source thereof by use of a probe capable of receiving the hollow handgrip over an elongated end portion of the probe. The probe has an elongated central passageway with an inlet for receiving a flow of liquid adhesive from the source thereof and an outlet in the end portion of the probe spaced from the inlet for dispensing the liquid adhesive from the probe end portion so as to produce the coating of liquid adhesive on the interior surface portion of the handgrip. Also, the probe has an annular groove defined circumferentially in the exterior surface of the probe end portion and in communication with the outlet of the passageway for receiving liquid adhesive from the outlet and wiping the liquid adhesive onto the interior surface portion of the handgrip as the handgrip is moved past the annular groove to remove the handgrip from the probe. The probe further includes a one-way flow valve disposed in the passageway of the probe between the inlet and outlet thereof. The one-way valve is operable to open in response to the start of flow of liquid adhesive and to close in response to the termination of flow of liquid adhesive.

The system and method further utilize a container for storing the liquid adhesive, sections of tubing for communicating a flow of liquid adhesive from the liquid adhesive storing container to the inlet of the probe, and control means interposed between sections of the tubing for controlling the flow of liquid adhesive to the probe at the desired times. The control means includes a pneumatic actuator, a fill and dispense tube, and control valves being selectively operable to start and terminate flow of liquid adhesive as well as to regulate the quantity of liquid adhesive flowing to the probe from the liquid adhesive storing container.

The adhesively-coated hollow handgrip is applied to the end portion of the shaft by use of a tool having a support body capable of receiving the hollow handgrip at a closed end of the handgrip having an orifice. The support body of the tool has an end portion with a hollow nipple inserted through the orifice of the closed end of the handgrip when the handgrip is received by the support body. Also, the tool has an on/off valve connected to the end portion of the support body in communication with the nipple by which a supply of gas under pressure can be introduced through the nipple into the hollow handgrip through the orifice to cause swelling in the diameter size of the handgrip when the end portion of the shaft is partially inserted through an opposite open end of the handgrip. The swelled handgrip can be floatably pushed over the end portion of the golf club shaft.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a longitudinal elevational view of an handgrip installing tool employed by the handgrip installing system and method of the present invention to install the adhesively coated hollow handgrip onto an elongated end portion of a golf club shaft.

FIG. 4 is a fragmentary longitudinal sectional view of the handgrip installing tool of FIG. 3, showing the tool coupled to a hollow handgrip and an end portion of a club shaft partially inserted through an open end of the handgrip.

DETAILED DESCRIPTION OF THE INVENTION

Figure 1:
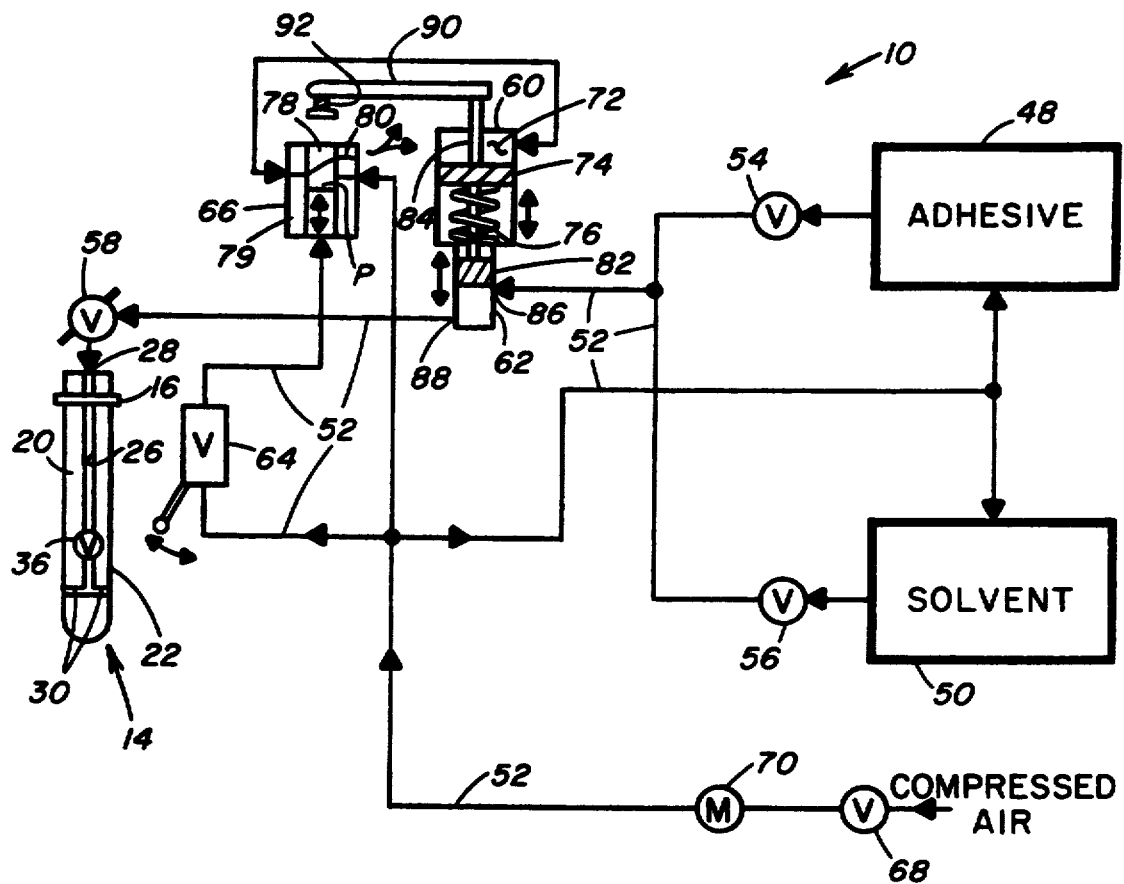
FIG. 1 is a plan diagrammatic view of an adhesive applying apparatus employed by the handgrip installing system and method of the present invention.

Referring to the drawings, and particularly to FIGS. 1, 3 and 4, there is illustrated a handgrip installing system of the present invention for installing an elongated hollow handgrip H over an elongated end portion E of a shaft S, such as a shaft of a golf club or any other instrument which uses a handgrip. The handgrip installing system basically includes means in the form an adhesive applying apparatus 10 operable for applying a liquid adhesive to an interior surface portion P of the hollow handgrip H so as to produce a coating of the adhesive A on the interior surface portion P of the hollow handgrip H, and means in the form of a handgrip installing tool 12 operable for applying the elongated hollow handgrip H with the coating of adhesive A applied on the interior surface portion P thereof over the elongated end portion E of the shaft S.

Figure 2:
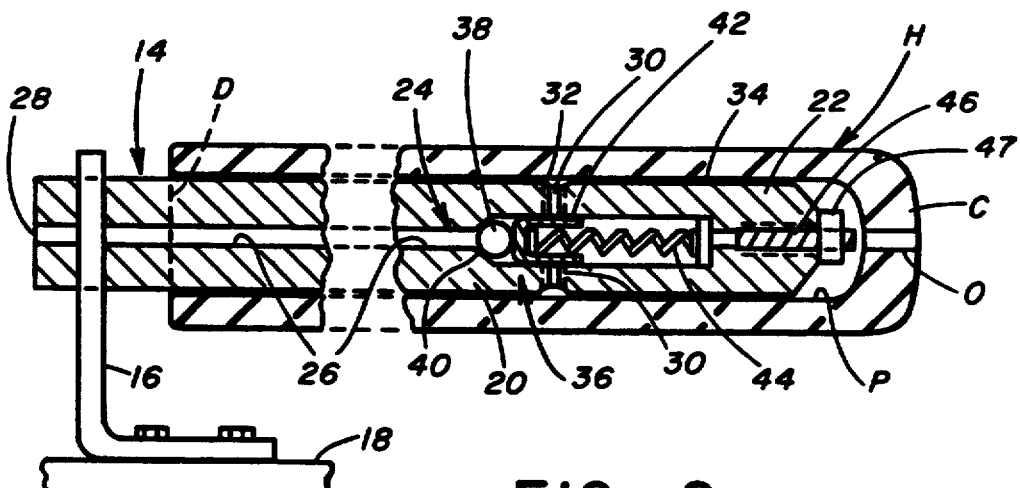
FIG. 2 is an enlarged foreshortened longitudinal sectional view of an adhesive receiving and dispensing probe of the adhesive applying apparatus of FIG. 1, showing the hollow handgrip inserted over the probe.

Referring to FIGS. 1 and 2, the adhesive applying apparatus 10 includes an elongated probe 14 supported by a bracket 16 mounted on a substrate 18. The probe 14 is mounted to the bracket 16 near one end so as to provide an elongated end portion 20 extending in cantilevered fashion from the bracket 16 being capable of receiving the hollow handgrip H over the probe end portion 20. The probe 14 includes a cylindrical body 22 and means 24 for receiving a flow of liquid adhesive therein and for dispensing the liquid adhesive from the probe end portion 18 so as to apply a coating of liquid adhesive A on an interior surface portion P of the hollow handgrip H.

The liquid adhesive receiving and dispensing means 24 of the probe 14 includes an elongated central passageway 26 defined axially through the probe body 22. The central passageway 26 has an inlet 28 for permitting entry of the flow of liquid adhesive into the passageway 26 and a plurality of outlets 30 in the probe end portion 20 spaced from the inlet 28 for permitting discharge of the flow of liquid adhesive from the passageway 26. The receiving and dispensing means 24 also includes an annular groove 32 formed in and extending circumferentially about the exterior surface 34 of the probe body 22 on the end portion 20 thereof. The outlets 30 open into the annular groove 32 such that flow communication is established from the passageway 26 to the annular groove 32 for receiving liquid adhesive therein via the outlets 30 to form a bead of adhesive about the exterior surface 34 of the probe body 22 in contact with the interior surface portion P of the hollow handgrip H. The liquid adhesive will be wiped onto the interior surface portion P of the hollow handgrip H as the handgrip H is pulled from the probe end portion 20 past the annular groove 32 to remove the handgrip H from the probe 14.

The receiving and dispensing means 24 of the probe 14 also includes a one-way flow check valve 36 disposed in an enlarged portion of the passageway 26 of the end portion 20 of the probe between the inlet 28 and outlets 30 and adjacent to the outlets 30. The flow valve 36 includes a ball 38 which blocks the passageway 26 when disposed against a seat 40 defined in the passageway 26. The ball 38 is held against the seat 40 by a cylindrical cup-shaped piston 42 connected to the end of a biasing spring 44. When the ball 38 is disposed against the seat 40, the piston 42 closes the outlets 30. The biasing spring 44 is anchored at an opposite end to a bolt 46 extending through an opening in the end of the probe 14. By turning the bolt 46 and then tightening the lock nut 47, the level of pressure exerted by the spring 44 against the ball 38 via the piston 42 can be correspondingly increased or decreased and set at any desired value. Thus, by so adjusting the bolt 46, the level of pressure of the flow of liquid adhesive that is required to overcome the biasing spring 44 and move the ball 38 and piston 42 away from the seat 40 and uncover the outlets 30 can be adjusted and set. The one-way flow valve 36 is thus operable to open in response to start of flow of liquid adhesive and to close in response to termination of the flow of liquid adhesive.

The adhesive applying apparatus 12 further includes a pair of separate storage container 48, 50 for storing respectively the liquid adhesive and a liquid solvent, a plurality of interconnected sections of tubing 52 for communicating a flow of liquid adhesive from the adhesive storage container 48 and a flow of solvent 50 from the solvent storage container 50 to the inlet 28 of the probe 14, and control means in the form of valves 54, 56 and 58 interposed between certain ones of the tubing sections 52 for controlling the flow of liquid adhesive and solvent to the probe 14 at the desired times. The respective valves 54, 56 are turned on and off, or vice versa, for supplying either adhesive or solvent, but not both, at any given time to the probe 14. The valve 58 connected to the probe 14 is adjustable for regulating the rate of flow of the liquid adhesive into and from the probe 14. The flow of liquid solvent is routed to the probe 14 for cleaning purposes after the periods of use of the adhesive applying apparatus 10 in applying the coating of adhesive to the interior surface portion P of the hollow handgrip H.

The control means of the adhesive applying apparatus 10 also includes a pneumatic actuator 60, a fill and dispense tube 62, and control valves 64 and 66. The control valves 64 and 66 are selectively operable to start and terminate flow of liquid adhesive. The valve 64 is a trip valve manually actuated by the operator for starting an adhesive fill and dispense cycle for adhesively coating one handgrip H. The valve 66 is a pneumatic actuator control valve which is actuated by the trip valve 64. Pressurized or compressed air from a suitable source of supply is routed through an on/off valve 68 and an air pressure meter 70 to the adhesive and solvent storage containers 48, 50 to ensure respective flows of liquid adhesive and solvent under positive pressure when desired and to the trip and control valves 64, 66 to initiate and control actuation of the pneumatic actuator 60.

Initially, the control valve 66 is in a vented position as shown in FIG. 1 wherein a chamber 72 in the actuator 60 above an upper piston 74 therein is vented through the control valve 66 to the atmosphere. In such initial position, the return spring 76 in the actuator 60 holds the upper piston 74 at a home position at the end of its reverse stroke. Then, when the trip valve 64 is switched or moved to initiate a dispense stroke of the operating cycle, it passes an impulse of pressurized air flow to a central shuttle 78 movably mounted in a housing 79 of the control valve 66 which is sufficient to move the shuttle 78 relative to the housing 79 from a vent position to a pressurize position so as to close a vent port 80 to the atmosphere and open a flow path P through the housing 79 of the control valve 66 from the compressed air source to the chamber 72 above the upper piston 74 in the actuator 60. The chamber 72 becomes pressurized sufficiently to overcome the biasing force of the return spring 76 and move the upper piston 74 downward through a forward stroke which, in turn, drives a lower piston 82 in the fill and dispense tube 62 downward along a dispense stroke. The downward movement of the lower piston 82, being connected by an elongated rod 84 to the upper piston 74, closes the inlet 86 of the fill and dispense tube 62 from the adhesive supply container 48 and causes dispensing of a desired flow of liquid adhesive from the outlet 88 of the tube 62 to the inlet 28 of the probe 14.

The control means of the adhesive applying apparatus 10 further includes an arm 90 supported above the pneumatic actuator 60 by an extension of the connecting rod 84 and extending over the top of the shuttle 78 of the control valve 66, and an adjustable stop 92 connected to the end of the arm 90 and aligned with the control valve shuttle 78. The stop 92 can be adjusted by turning it to thread it into or from the end of the arm 88 and thereby to regulate (increase or decrease) the length of the stroke of the upper piston 74 and connecting rod 84 in the pneumatic actuator 60 and thereby regulate the quantity of liquid adhesive filled into the tube 62 from the adhesive storage container 48 and dispensed from the tube 62 to the probe 14. The stop 92 regulates or determines the stroke length by terminating movement of the upper piston 74 through contacting and moving the shuttle 78 to shutoff the flow of pressurized air through the control valve 66 to the chamber 72 and instead divert the pressurized air from the chamber 72 to the atmosphere through the vent port 80.

At termination of dispensing of liquid adhesive from the tube 62 and of the flow of liquid adhesive to the probe 14, the valve ball 38 is returned to the valve seat 40, by the action of return spring 44, and the valve piston 42 closes off the outlets 30 of the probe 14. Such action by the piston 42 prevents air from being drawn back through the probe 14 and into the fill and dispense tube 62 when the pneumatic actuator spring 76 moves the upper piston 74 upwardly through a reverse stroke and thereby move the lower piston 82 upwardly along a fill stroke of the operating cycle. Instead, only another desired quantity of liquid adhesive is drawn into the tube 62 from the adhesive storage container 48 so as to replenish the adhesive in the tube 62 to prepare for the initiate of another operating cycle to coat another handgrip.

Referring to FIGS. 3 and 4, the tool 12 used to apply the adhesively-coated hollow handgrip H to the end portion E of the golf club shaft S has a support body 94 capable of receiving and holding the handgrip H at a closed end C of the handgrip H. The closed end C of the handgrip H typically has a small orifice O. (Should it not have an orifice, one can easily be pierced in the handgrip). The support body 94 of the tool 12 has an end portion 96 with a hollow nipple 98 projecting therefrom which inserts through the orifice O of the closed end C of the handgrip H when the handgrip H is received by the support body 94. The support body 94 of the tool 12 also has an extension portion 100 connected to and extending axially from the end portion 96 of the support body and of semi-cylindrical configuration adapting it to support the handgrip H with the hollow nipple 98 extending through the orifice O in the closed end C of the handgrip H. Also, the tool 12 has an on/off valve 102 connected to the end portion 96 of the support body 94 and communicating with the hollow nipple 98. The valve 102 has a lever 104 pivotable between a first position for causing opening of the valve 102 so as to permit flow of pressurized gas through the nipple 98 and a second position for causing closing of the valve 102 so as to terminate flow of pressurized gas through the nipple 98.

A supply of gas under pressure can be introduced by the valve 102 through the nipple 98 into the hollow handgrip H fabricated of resiliently flexible material so as to cause swelling in the diameter size of the handgrip H, as represented by the dashed line L in FIG. 4, when the end portion E of the golf club shaft S is at least partially inserted through an opposite open end D of the handgrip H. The swelled handgrip H can now easily be floatably slid over the end portion E of the golf club shaft S by pushing it towards the shaft S using the tool 12.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. An apparatus for applying an adhesive to an interior surface portion of a hollow handgrip, said apparatus comprising:

(a) a probe having an elongated end portion capable of receiving a hollow handgrip thereover and an elongated central passageway extending axially in said probe through said end portion thereof, said probe having an inlet permitting entry of the flow of liquid adhesive into said passageway and an outlet in said end portion spaced from said inlet for permitting discharge of the flow of liquid adhesive from said passageway and into the hollow handgrip;

(b) a storage container for storing the liquid adhesive;

(c) a fill and dispense mechanism connected to said inlet of said probe and said liquid adhesive storage container and adapted, in response to application of a predetermined pressurized fluid to said fill and dispense mechanism, to communicate a flow of liquid adhesive from said storage container to said passageway of said probe via said inlet thereof, said fill and dispense mechanism including a tube connected to said liquid adhesive storage container and said inlet of said probe, said fill and dispense mechanism also including a pneumatic actuator disposed adjacent to said tube and a piston disposed in said tube and connected to said pneumatic actuator, said piston in response to operation of said pneumatic actuator through forward and reverse strokes being movable relative to said tube correspondingly along dispense and fill strokes to respectively dispense liquid adhesive from said tube to said probe and fill liquid adhesive into said tube from said storage container, said pneumatic actuator being biased to operate through said reverse stroke and thereby move said piston along said fill stroke;

(d) a source of pressurized fluid connected to said liquid adhesive storage container and adapted to pressurize the liquid adhesive in said storage container to a predetermined level of positive pressure so as to cause a flow of liquid adhesive from said storage container to said tube of said fill and dispense mechanism;

(e) a control mechanism connected to said fill and dispense mechanism and said source of pressurized fluid, said control mechanism including a control valve having a housing connected to said pneumatic actuator and said source of fluid pressure and an element movable relative to said housing between a pressurize position in which pressurized fluid is supplied from said source of fluid pressure through said housing of said control valve to said pneumatic actuator so as to cause said pneumatic actuator to operate through a forward stroke and move said piston relative to said tube along said dispense stroke and start the flow of liquid adhesive from said tube to said inlet of said probe and a vent position in which pressurized fluid is exhausted from said pneumatic actuator through said housing of said control valve to atmosphere so as to cause said pneumatic actuator to operate through a reverse stroke and move said piston along said fill stroke and terminate the flow of liquid adhesive to said inlet of said probe, said control mechanism further including a trip valve connected to said control valve and said source of fluid pressure, said trip valve being operable to cause said element of said control valve to move relative to said housing thereof from said vent position to said pressurize position, said control mechanism also including a member connected to said pnuematic actuator and engageable with said element of said control valve so as to move said element from said pressurize position to said vent position relative to said housing of said control valve in response to operation of said pneumatic actuator through said forward stroke; and (f) means defined in said probe for receiving the flow of liquid adhesive to said probe and for dispensing the liquid adhesive from said probe end portion so as to produce the liquid adhesive coating on the interior surface portion of the handgrip, said receiving and dispensing means including a one-way flow valve disposed in said passageway of said end portion of said probe between said inlet and outlet thereof, said valve being operable to open in response to start of flow of liquid adhesive from said tube of said fill and dispense mechanism and to close in response to termination of the flow of liquid adhesive from said tube of said fill and dispense mechanism.

2. The apparatus of claim 1 wherein said receiving and dispensing means of said probe also includes:

an annular groove formed in and extending circumferentially about an exterior surface on said end portion of said probe and in flow communication with said outlet of said passageway for receiving liquid adhesive from said outlet and wiping the liquid adhesive onto the interior surface portion of the handgrip as the handgrip is moved past said annular groove to remove the handgrip from said probe.

3. A system for installing an elongated hollow handgrip over an elongated end portion of a shaft, said system comprising:

(a) means for applying a liquid adhesive to an interior surface portion of an elongated hollow handgrip so as to produce a coating of liquid adhesive on the interior surface portion of the hollow handgrip, said liquid adhesive applying means including (i) a probe having an elongated end portion capable of receiving the hollow handgrip thereover and an elongated central passageway extending axially in said probe and through said end portion thereof, said probe having an inlet permitting entry of the flow of liquid adhesive into said passageway and an outlet in said end portion spaced from said inlet for permitting discharge of the flow of liquid adhesive from said passageway and into the hollow handgrip, (ii) a storage container for storing the liquid adhesive, (iii) a fill and dispense mechanism connected to said inlet of said probe and said liquid adhesive storage container and adapted, in response to application of a predetermined pressurized fluid to said fill and dispense mechanism, to communicate a flow of liquid adhesive from said storage container to said passageway of said probe via said inlet thereof, said fill and dispense mechanism including a tube connected to said liquid adhesive storage container and said inlet of said probe, said fill and dispense mechanism also including a pneumatic actuator disposed adjacent to said tube and a piston disposed in said tube and connected to said pneumatic actuator, said piston in response to operation of said pneumatic actuator through forward and reverse strokes being movable relative to said tube correspondingly along dispense and fill strokes to respectively dispense liquid adhesive from said tube to said probe and fill liquid adhesive into said tube from said storage container, said pneumatic actuator being biased to operate through said reverse stroke and thereby move said piston along said fill stroke, (iv) a source of pressurized fluid connected to said liquid adhesive storage container and adapted to pressurize the liquid adhesive in said storage container to a predetermined level of positive pressure so as to cause a flow of liquid adhesive from said storage container to said tube of said fill and dispense mechanism, (v) a control mechanism connected to said fill and dispense mechanism and said source of pressurized fluid, said control mechanism including a control valve having a housing connected to said pneumatic actuator and said source of fluid pressure and an element movable relative to said housing between a pressurize position in which pressurized fluid is supplied from said source of fluid pressure through said housing of said control valve to said pneumatic actuator so as to cause said pneumatic actuator to operate through a forward stroke and move said piston relative to said tube along said dispense stroke and start the flow of liquid adhesive from said tube to said inlet of said probe and a vent position in which pressurized fluid is exhausted from said pneumatic actuator through said housing of said control valve to atmosphere so as to cause said pneumatic actuator to operate through a reverse stroke and move said piston along said fill stroke and terminate the flow of liquid adhesive to said inlet of said probe, said control mechanism further including a trip valve connected to said control valve and said source of fluid pressure, said trip valve being operable to cause said element of said control valve to move relative to said housing thereof from said vent position to said pressurize position, said control mechanism also including a member connected to said pnuematic actuator and engageable with said element of said control valve so as to move said element from said pressurize position to said vent position relative to said housing of said control valve in response to operation of said pneumatic actuator through said forward stroke, and (vi) means defined in said probe for receiving the flow of liquid adhesive to said probe and for dispensing the liquid adhesive from said probe end portion so as to produce the liquid adhesive coating on the interior surface portion of the handgrip, said receiving and dispensing means including a one-way flow valve disposed in said passageway of said end portion of said probe between said inlet and outlet thereof, said valve being operable to open in response to start of flow of liquid adhesive from said tube of said fill and dispense mechanism and to close in response to termination of the flow of liquid adhesive from said tube of said fill and dispense mechanism; and (b) means for applying the elongated hollow handgrip with the coating of liquid adhesive applied on the interior surface portion of the handgrip over an elongated end portion of a shaft.

4. The system of claim 1 wherein said receiving and dispensing means also includes:

an annular groove formed in and extending circumferentially about an exterior surface on said end portion of said probe and in flow communication with said outlet of said passageway for receiving liquid adhesive from said outlet and wiping the liquid adhesive onto the interior surface portion of the handgrip as the handgrip is moved past said annular groove to remove the handgrip from said probe.

5. The system of claim 3 wherein said handgrip applying means includes:

a support body capable of receiving the handgrip at a closed end of the handgrip having an orifice and being opposite from an open end of the handgrip, said support body having an end portion with a hollow nipple projecting therefrom for insertion through the orifice of the handgrip closed end; and means for introducing a supply of gas under pressure into the handgrip through said nipple of said support body to cause swelling in diameter size of the handgrip once the end portion of the shaft is partially inserted through the opposite open end of the handgrip such that the swelled handgrip can then be completely inserted over the end portion of the shaft.

6. The system of claim 5 wherein said support body has an extension portion connected to and extending axially from said end portion thereof and configured to support the handgrip with the nipple inserted through the orifice in the closed end of the handgrip.

7. The system of claim 5 wherein said gas introducing means is a valve connected to said end portion of said support body and communicating with said nipple, said valve having a lever pivotable between a first position for causing opening of said valve to permit flow of pressurized gas through said nipple and a second position for causing closing of said valve to terminate flow of pressurized gas through said nipple.

* * * * *